UNITED STATES PATENT OFFICE.

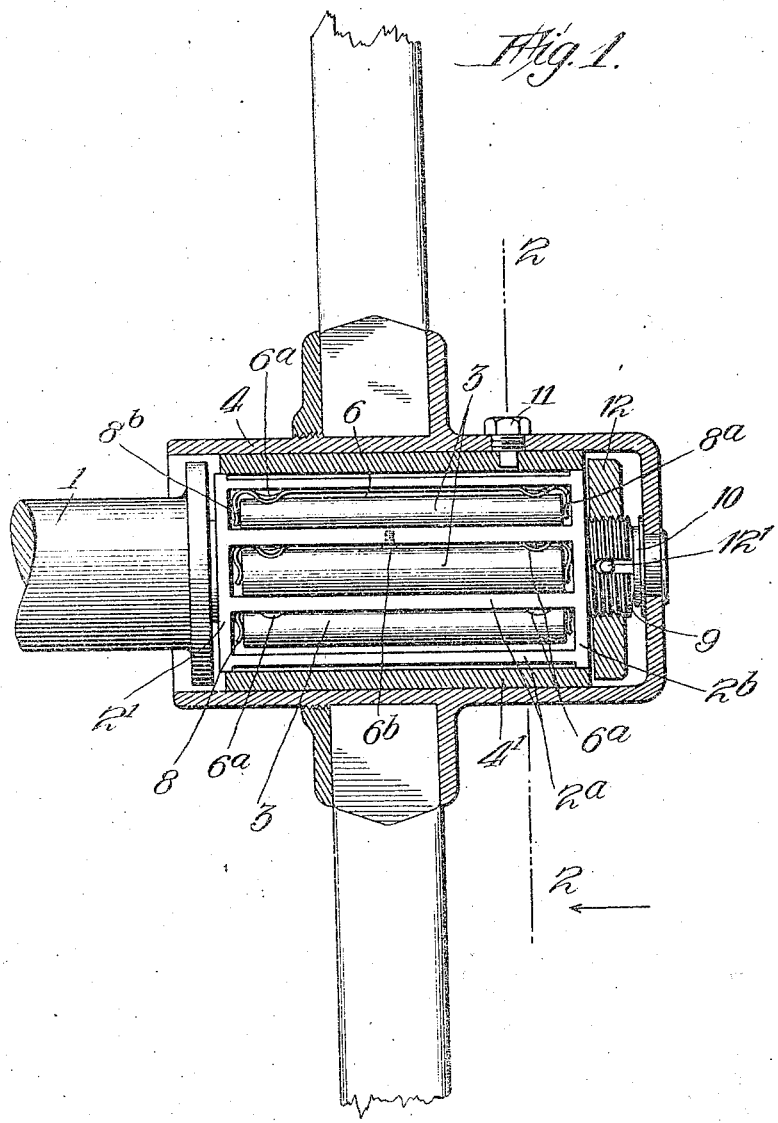

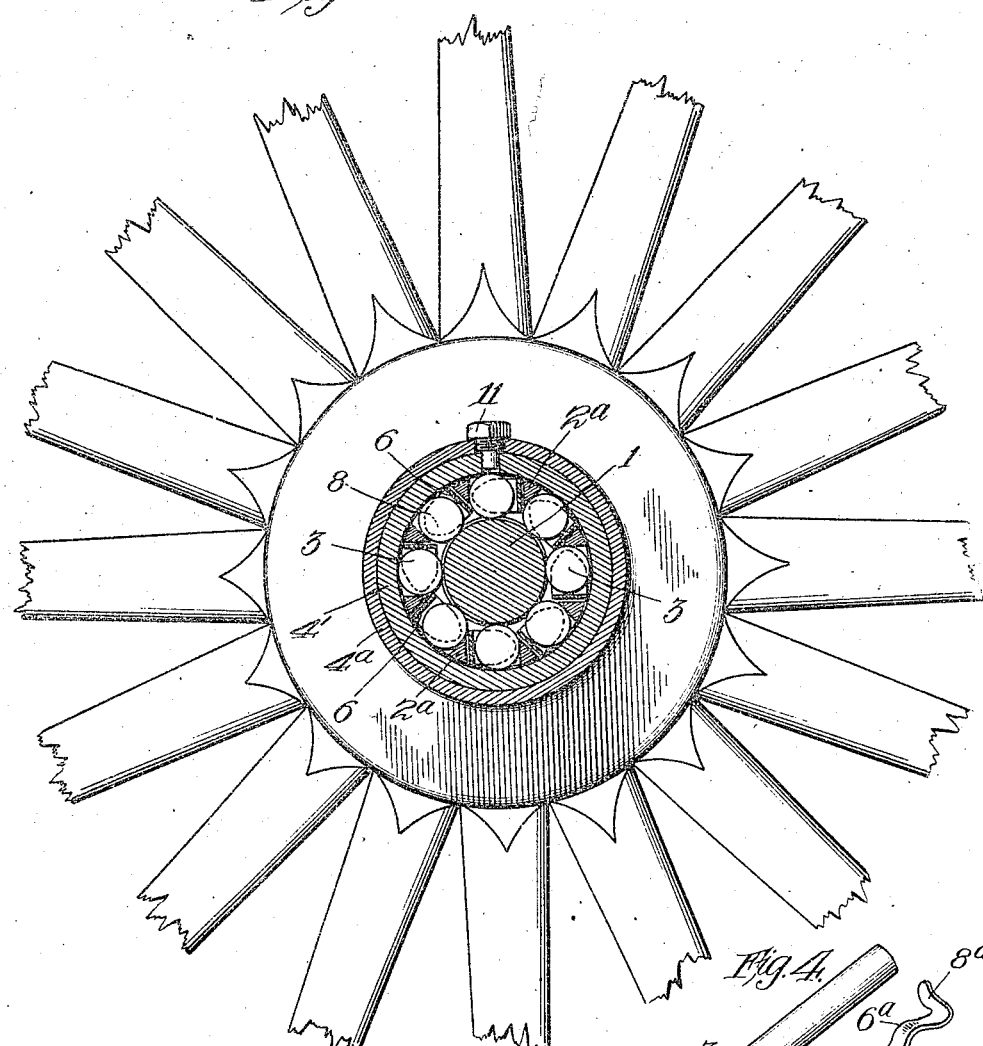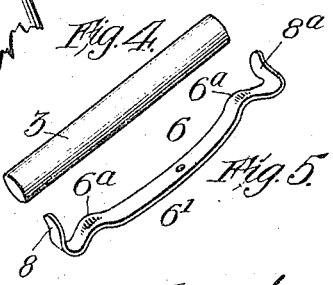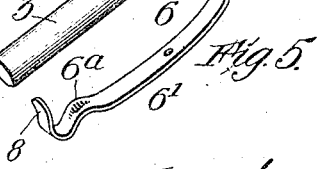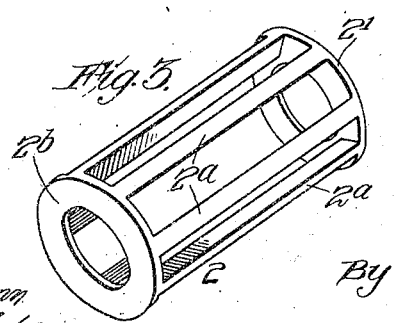

MELVIN A. YEAKLEY, OF CANTON, OHIO, ASSIGNOR TO JOHN E. McLAIN, OF CANTON, OHIO.

ANTIFRICTION-BEARING.

1,141,675.  Specification of Letters Patent. Patented June 1, 1915.

Application filed November 10, 1908. Serial No. 461,967.

*To all whom it may concern:*

Be it known that I, MELVIN A. YEAKLEY, a citizen of the United States, residing at Canton, in the county of Stark and State of Ohio, have invented certain new and useful Improvements in Antifriction-Bearings, of which the following is a specification, reference being had therein to the accompanying drawings.

My invention relates to an anti-friction bearing.

One object of the invention is to provide yielding means at one side of each of the anti-friction devices of the bearing to absorb the thrust movement thereof and maintain the anti-friction elements in operative position.

Another object of the invention is to provide means to take the end thrust of the anti-friction devices.

The invention also consists in the combination or combinations of parts hereinafter described and set forth in the claims.

The invention may be adapted to all forms of bearings that are provided with anti-friction devices. As one illustration of such adaptation, I have for convenience illustrated in the drawings and described herein, the invention as applied to a vehicle wheel, but it is not to be intended by such drawings and description that the invention is limited to such a device.

Referring to the drawings, Figure 1 is an elevation, partly in section, of a bearing embodying my invention. Fig. 2 is a section on the line 2—2, Fig. 1. Figs. 3, 4 and 5 are detail views.

In the drawings, 1 indicates an axle.

2 indicates a casing or cage surrounding the axle 1 and comprising an annular base 2' and a series of bars $2^a$, preferably formed integral with one surface thereof and arranged apart at intervals to form spacing devices.

$2^b$ indicates a ring which is preferably provided at the opposite end of the casing. The ring $2^b$ may be formed integral with the bars $2^a$.

3 indicates the anti-friction devices preferably comprising rollers mounted between the bars $2^a$ around the axle 1. These rollers engage with and form the bearing surfaces between the axle 1 and the hub 4, of a wheel 5. The hub 4 preferably comprises a bushing 4' surrounding the casing 2 and forming a confining wall for the rollers in coöperation with the sides of the bars $2^a$, and a hub case $4^a$ which may entirely inclose the bearing to keep it free of dust and dirt.

6 indicate resilient or yielding means arranged on one side of each bar $2^a$ and between it and a roller 3. These resilient means preferably comprise a spring strip of metal 6' having laterally bent portions $6^a$ near its opposite ends that engage with the adjacent roller. As illustrated in the drawings, there is a yielding device 6 between one side of each roller 3 and an adjoining spacing bar $2^a$, and that all of the yielding devices are arranged on the same side of the rollers. This construction of bearing permits limited movements between the hub 4 and axle 1 in lateral directions, which movements are caused by abnormal forces acting on the wheel and operate to bind the rollers 3 at one end against the spacing bars $2^a$, or other parts of the bearing. When these forces cease, the yielding devices 6 press the rollers 3 back into normal position again so that the hub 4 will run true on the axle 1.

8 indicate yielding or resilient means arranged between the opposite ends of the rollers and the rings $2^a$, $2^b$. For convenience, these yielding means are formed by bending over the ends of the strips 6' so that they engage the rings $2^a$, $2^b$, at $8^a$ and the ends of the rollers at $8^b$. The yielding means 8, operate to take the end thrust of the rollers. The springs 6' may be riveted or otherwise secured to the bars $2^a$, as indicated at $6^b$.

9 indicates a thrust bearing formed in the end of the axle.

10 indicates a cone carried by the hub case $4^a$ to engage with the bearing 9.

11 indicates a screw for securing the case $4^a$ to the bushing 4'.

In assembling the parts, the roller casing 2, containing the rollers and the bushing 4', are first slipped over the axle. The axle nut 12 is then screwed into place and locked by a pin 12'. As shown in the drawings, the nut 12 is large enough in diameter to overlap the end of the bushing 4' and thus hold it and the casing in position. The case $4^a$, carrying the spokes and wheel rim, is then slipped over the end of the axle and bushing 4' and secured to the latter by the screw 11.

What I claim is—

1. In a bearing, the combination of an axle, a series of rollers, and means for spacing said rollers relatively to each other, said means including a ring arranged at one end of said rollers and loosely mounted on said axle and a plurality of laterally yieldable devices extending longitudinally of said rollers and supported from said ring and each arranged to engage the outside periphery of an adjacent roller.

2. In a bearing, the combination of a cage comprising a ring and a series of bars, a series of rollers mounted between the bars, and a spring strip arranged between each roller and a bar.

3. In a bearing, the combination of a cage comprising a ring and a series of bars, a series of rollers mounted between the bars, and a spring strip arranged between each roller and one side of each bar.

4. In a bearing, the combination of a cage comprising a ring and a series of bars, a series of rollers mounted between the bars, and a spring strip arranged between each roller and one side of each bar and all of the strips being arranged on the same side thereof.

5. In a bearing, the combination of a series of rollers, bars for spacing the rollers apart, and a spring strip arranged between each roller and an adjoining bar.

6. In a bearing, the combination of a series of rollers, bars for spacing the rollers apart, a spring strip arranged between each roller and an adjoining bar and each strip having one end bent over one end of each roller to form yielding means for the end thrust movement of the roller.

7. In a bearing, the combination with two members, one of which rotates relative to the other, of a frame comprising an end wall and a series of spacers rigidly supported relatively to each other by said end wall, a series of anti-friction devices for the said members arranged between the spacers and movable bodily in endwise and lateral directions, and yielding means arranged between one side of each device and the face of an adjacent spacer and between one end of each device and said end wall, and operating to resist stresses imparted to said anti-friction devices.

8. A new article of manufacture for a bearing having anti-friction devices, comprising a spring strip arranged to engage the circumferential surface of a device and provided with yieldable end members arranged to engage the opposite ends of the device.

In testimony whereof I affix my signature, in the presence of two witnesses.

MELVIN A. YEAKLEY.

Witnesses:
 JOSEPH HOLLIS,
 A. M. McCARTY.